US006907122B2

(12) United States Patent
Chiang et al.

(10) Patent No.: US 6,907,122 B2
(45) Date of Patent: Jun. 14, 2005

(54) ROTATIONAL SPLIT ADAPTOR

(75) Inventors: Yi-Te Chiang, Taipei (TW); Hsueh-Lan Lin, Pan Chiao (TW)

(73) Assignee: Primax Electronics Ltd., Taipei (TW)

( * ) Notice: Subject to any disclaimer, the term of this patent is extended or adjusted under 35 U.S.C. 154(b) by 90 days.

(21) Appl. No.: 10/660,510

(22) Filed: Sep. 12, 2003

(65) Prior Publication Data

US 2004/0252828 A1 Dec. 16, 2004

(30) Foreign Application Priority Data

Jun. 12, 2003 (CN) ........................................ 03143022 A

(51) Int. Cl.[7] ................................................ H04M 1/00
(52) U.S. Cl. .................... 379/438; 379/433.13; 439/296
(58) Field of Search ........................ 379/433.12, 433.13, 379/438; 439/296, 345, 361, 365, 372

(56) References Cited

U.S. PATENT DOCUMENTS 4,533,796 A * 8/1985 Engelmore ................... 439/24
6,164,989 A * 12/2000 Glad et al. .................. 439/131
6,832,920 B2 * 12/2004 Glad et al. .................. 439/131

* cited by examiner

*Primary Examiner*—Bing Q. Bui
(74) *Attorney, Agent, or Firm*—Troxell Law Office, PLLC

(57) ABSTRACT

A rotational split adaptor for engaging with gold-plated contacts of a communication socket is introduced to comprise a common plug, a socket assembly and a rotational joint. The common plug further includes a plug end for engaging with the communication socket and an opposing first oblique surface. The socket assembly further includes a splitter and an opposing second oblique surface. The splitter has a plurality of parallel sockets electrically coupling with the communication socket, and the second oblique surface is used to pair with the first oblique surface. The rotational joint is constructed to pair the first oblique surface and the second oblique surface so as to provide angular sliding in between and thus to alter angling between the socket assemble and the common plug.

6 Claims, 5 Drawing Sheets

ROTATIONAL SPLIT ADAPTOR

BACKGROUND OF THE INVENTION (1) Field of the Invention

The invention relates to a rotational split adaptor, and more particularly to a communication adaptor which has various directional states for receiving incoming plugs.

(2) Description of the Prior Art

In the information age, the knowledge or information flow does highly depend on networking, which includes existing telnet, cable net and fiber net. Typically, either of the foregoing nets is extended to reach individual family by a form of a wall plate having a receiving socket constructed on an interior wall.

Referring to FIG. 1, a communication connector pair 10 as shown includes a wall plate 12 to be fixed to an interior wall by screws 14. A socket 16 is formed on the wall plate 12 and has a door thereof flush with the exterior surface of the wall plate 12. A plurality of gold-plated contacts 18 are constructed inside the socket 16, for coupling with signal wires shielded inside a cord 17 at an opposing plug 15. The engagement of the signal wires and the respective gold-plated contacts 18 are done by mating the plug 15 and the socket 16. In application, while a communication system/equipment (not shown) as a telephone or a computer, for example, is ready to be hooked up with a foreign communication system/network, the communication can be simply established by introducing the plug 15 of an extension cord from the equipment to the socket 16 designated as a terminal of the foreign network; i.e. by forming a foregoing connector pair 10 as shown in FIG. 1.

Nevertheless, it is typical that more than one communication systems may exist in a reachable region of a wall plate 12 having the socket 16. For instance, a socket 16 of the wall plate 12 connected with a foreign telnet might be designed to bear various sets of telephones or communication facilities. Under such a circumstance, an adaptor with split sockets and a common plug is required to be applied to the socket 16 of the wall plate 12.

As shown in FIG. 1, the connector pair 10 is there to bridge a domestic communication system/equipment having the plug 15 with a foreign communication net extended to the socket 16 of the wall plate 12. In practice, interior layout of cords or cables leading to the plug 15 or socket 16 is usually on the wall and along corners of the house. Also, it is noted that a conventional wall plate 12 is usually flush with the wall and thus makes the socket 16 perpendicular to the wall in an installation wise. As a consequence, each of the respective plug 15 engaging the socket 16 also poses a perpendicular-to-wall state which definitely bends the cord 12 at a substantial curvature. Upon such an arrangement, each involved cord 12 including the plastic material and the enveloped wire will take a substantial large bending which, after a period of service time, will lead to the fatigue of the cord 12 and thus make the plastic brittle and the break of the wire possible. No matter what kind of the damage made to the cord 17 due to the bending, the signal flow along the cord is definitely affected.

Therefore, a preferred resort to overcome the aforesaid problem is always welcome in the art, and thereby, hopefully, the communication quality can be ensured.

SUMMARY OF THE INVENTION

Accordingly, it is a primary object of the present invention to provide a rotational split adaptor which can alter the facing of receiving sockets so as to engage the incoming plug as well as the cord at a less-bending state.

It is a secondary object of the present invention to provide a rotational split adaptor which includes a plurality of sockets to serve various equipments so as to simultaneously connect with a foreign network.

The rotational split adaptor in accordance with the present invention, provided to engage electrically with a conventional socket, can include a common plug, a socket assembly, and a rotational joint.

The common plug can further include a plug end and a first oblique surface. The plug end provides a plurality of contact terminals for coupling with respective gold-plated contacts of the socket while the common plug is introduced to the respective socket. Preferably, the first oblique surface is a 45-degree surface facing downward.

The socket assembly can have at least a socket and a second oblique surface. Each socket has an interior socket base providing a plurality of gold-plated contacts for wiring to respective contact terminals at the plug end of the common plug. Further, the second oblique surface is preferable a 45-degree surface facing upward for pairing with the first oblique surface of the common plug.

The rotational joint is constructed to pair rotationally the first surface and the second surface so that these two surfaces can rotate against each other. Thereby, the angle between the socket assembly and the common plug can be altered.

All these objects are achieved by the rotational split adaptor described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a rotational split adaptor. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
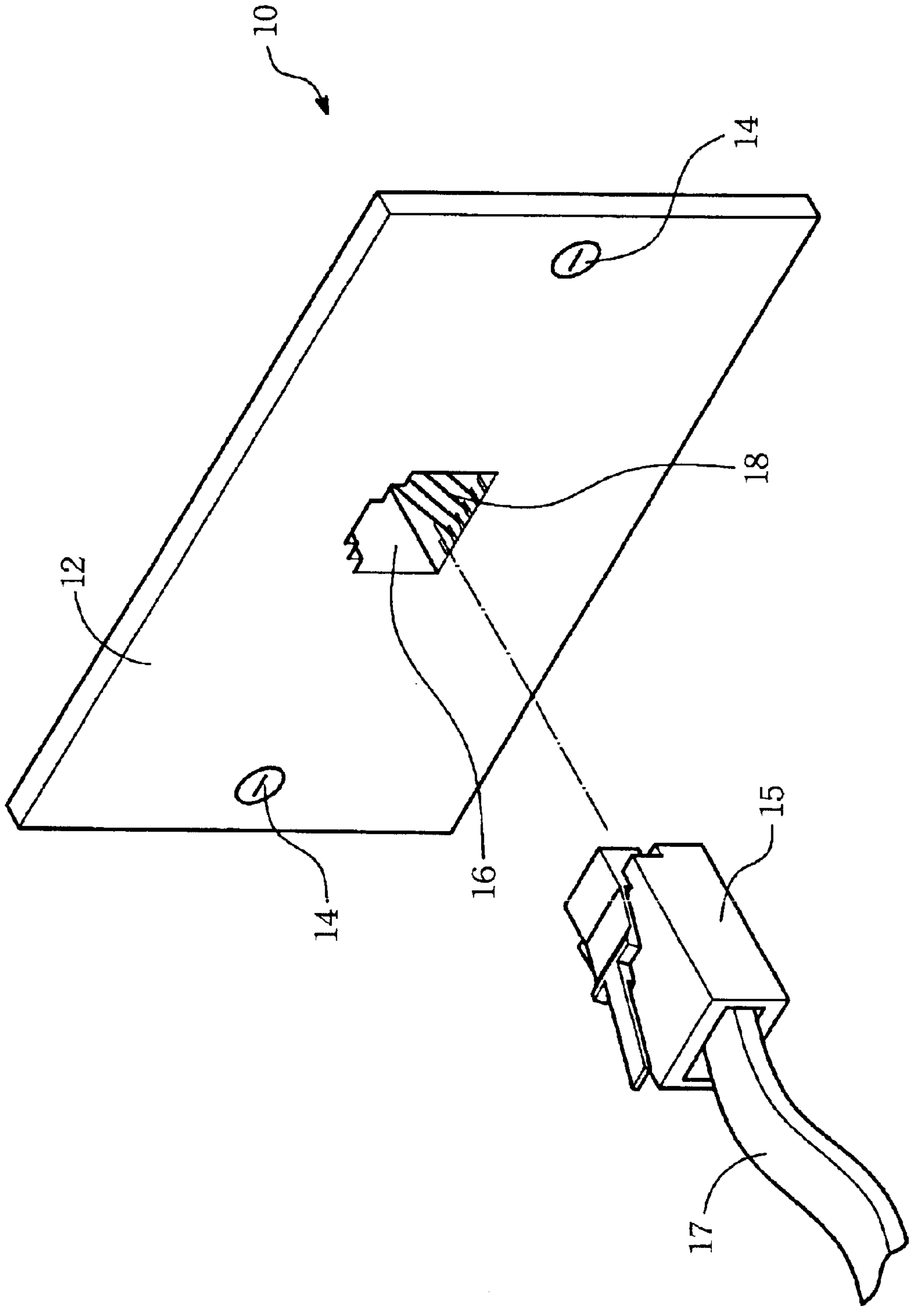
FIG.1 (PRIOR ART)
FIG. 1 is a perspective view of a disengaged conventional communication connector pair.
Figure 2:
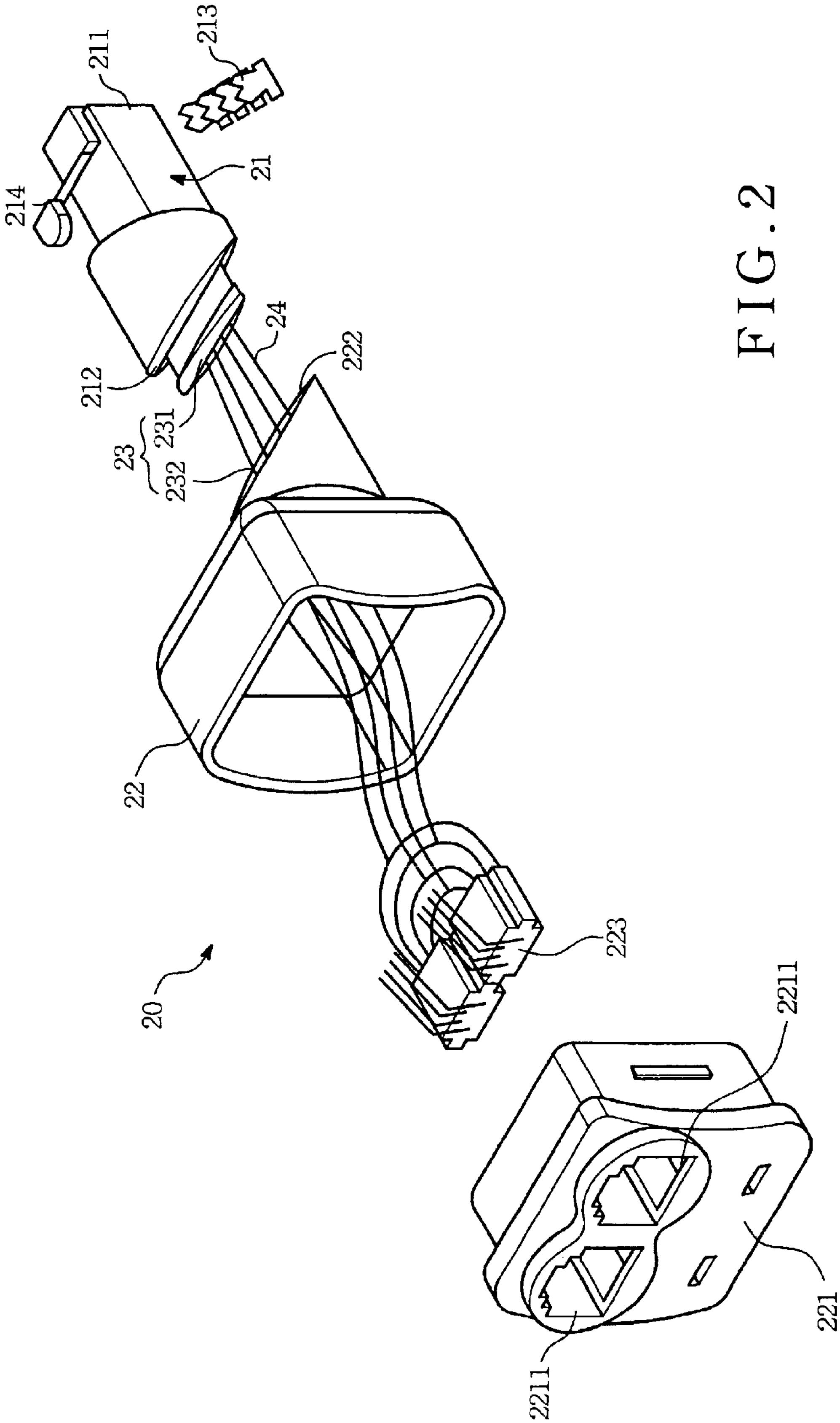
FIG. 2 is an exploded perspective view of a preferred rotational split adaptor in accordance with the present invention.

Referring now to FIG. 2, a preferred embodiment of the rotational split adaptor 20 in accordance with the present invention is shown to have a common plug 21, a socket assembly 22, and a rotational joint 23.

The common plug 21 of the present invention has one end to form a plug end 211 while the other end is formed as a first oblique surface 212. The plug end 211 is shaped as a general plug applicable to any normal socket and provides a plurality of contact terminals 213, located at a lower position thereof, for coupling with respective gold-plated contacts of the socket in the case that the common plug 21 is introduced to the respective upper position opposing to the contact terminals 213. By providing the depressible spring press bar 214, the plug end 211 can be firmly engaged with a respective socket so that the coupling between the contact terminals 213 and the gold-plated contacts of the socket can be ensured. In the case that the plug end 211 needs to retrieve from a socket, the spring press bar 214 can be simply depressed to release the firm engagement state of the plug end 211 and the socket, and then the plug end 211 can be easily removed. On the other hand, the first oblique surface 212 of the common plug 21 can be a 45-degree surface facing downward as shown in FIG. 2.

The socket assembly 22 of the present invention can have one end formed a splitter 221 having at least a socket 2211 (two shown in the figure) and another end formed a second oblique surface 222. The second oblique surface 222 is preferable a 45-degree surface facing upward for pairing with the first oblique surface 212 of the common plug 21. Each socket 2211 of the splitter 221 has an interior socket base 223 providing a plurality of gold-plated contacts for wiring through the signal wires 24 to respective contact terminals 213 at the plug end 211 of the common plug 21.

The rotational joint 23 is constructed to pair rotationally the first surface 212 and the second surface 222 so that these two surfaces 212 and 222 can rotate against each other. Thereby, the angle between the socket assembly 22 and the common plug 21 can be altered. As shown, the rotational joint 23 can include a pivotal shaft 231 extended from the first surface 212 and a sleeve 232 constructed at the end of the socket assembly 22 having the second surface 222. By providing the pair of the sleeve 232 and the pivotal shaft 231, the socket assembly 22 can then rotate with respect to the common plug 21. Also, the pivotal shaft 231 can be hollow so that the signal wires 24 connecting the socket base 223 and the contact terminals 213 can penetrate therethrough.

In another embodiment of the present invention (not shown here), the pivotal shaft can be constructed at the socket assembly and the sleeve can be located at the common plug. Yet, such a variation is well known to a skilled person in the art. Therefore, details about those possible variations related to the rotational joint are omitted herein.

Figure 3:
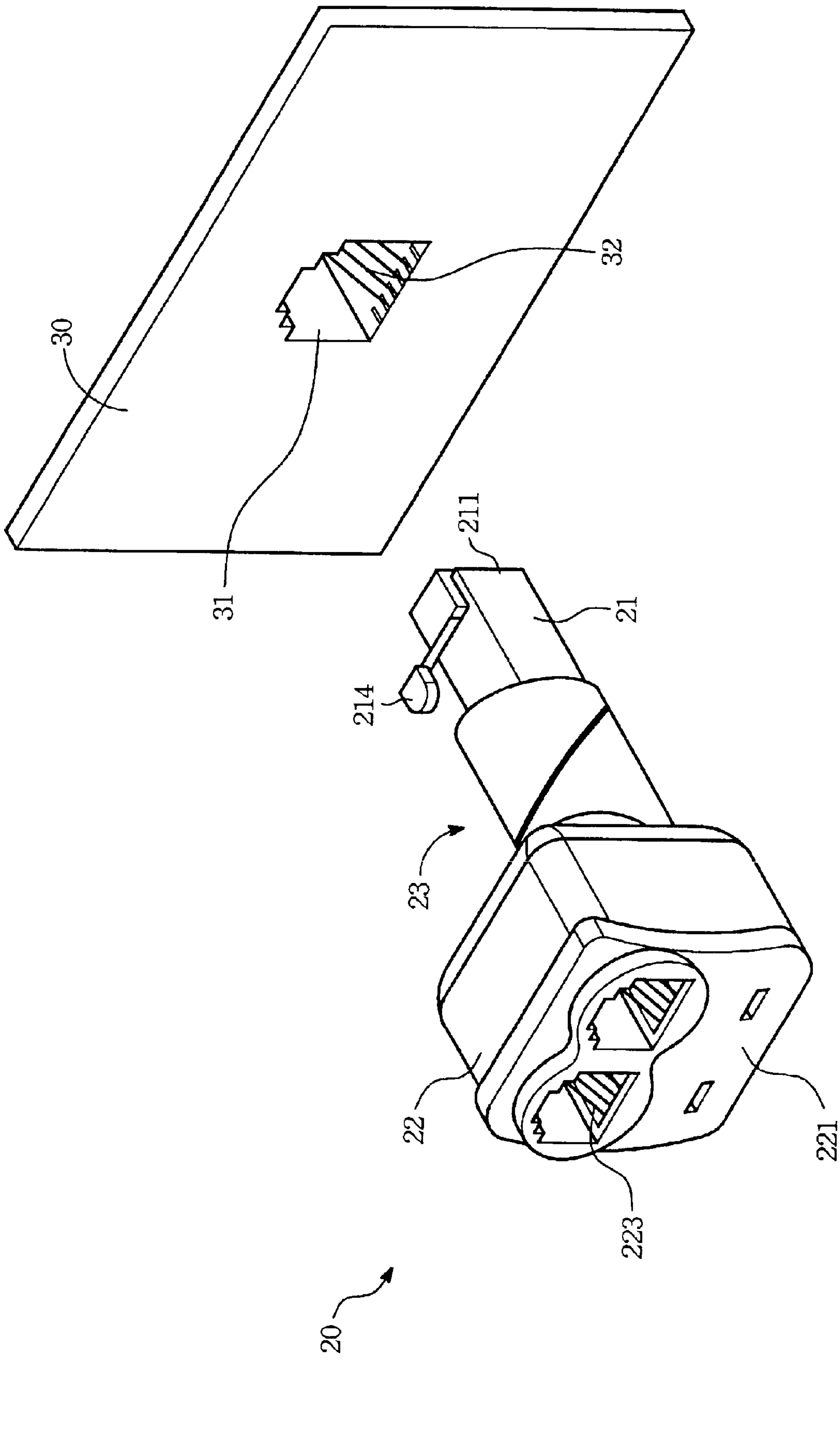
FIG. 3 is a perspective view of the rotational split adaptor of FIG. 2 in a position prior to engaging a socket of a wall plate.

Referring now to FIG. 3, the rotational split adaptor 20 of the present invention extends in parallel the gold-plated contacts 32 of the wall plate 30 by sending its plug end 211 into the respective communication socket 31. In general, the wall plate 30 is constructed on a wall or on the floor. Electrically connection in between is established by coupling the contact terminals 213 of the plug end 211 with the respective gold-plated contact 32. Upon such an arrangement, interfacing of the foreign communication can be then transferred from the communication socket 31 to the splitter 221 of the rotational split adaptor 20.

In the present invention, the rotational joint 23 coupling the common plug 21 and the socket assembly 22 is targeted to provide various angling options to the socket assembly 22 with respect to the common plug 21. The angling options are made possible by angularly sliding the first oblique surface 212 along the second oblique surface 222 with the help from the pivotal shaft 231 and the sleeve 232. Preferably, the angling options are ranged from 180° to −180° to prevent the signal wires 24 thereinside from possible torsion damage.

Figure 4A:
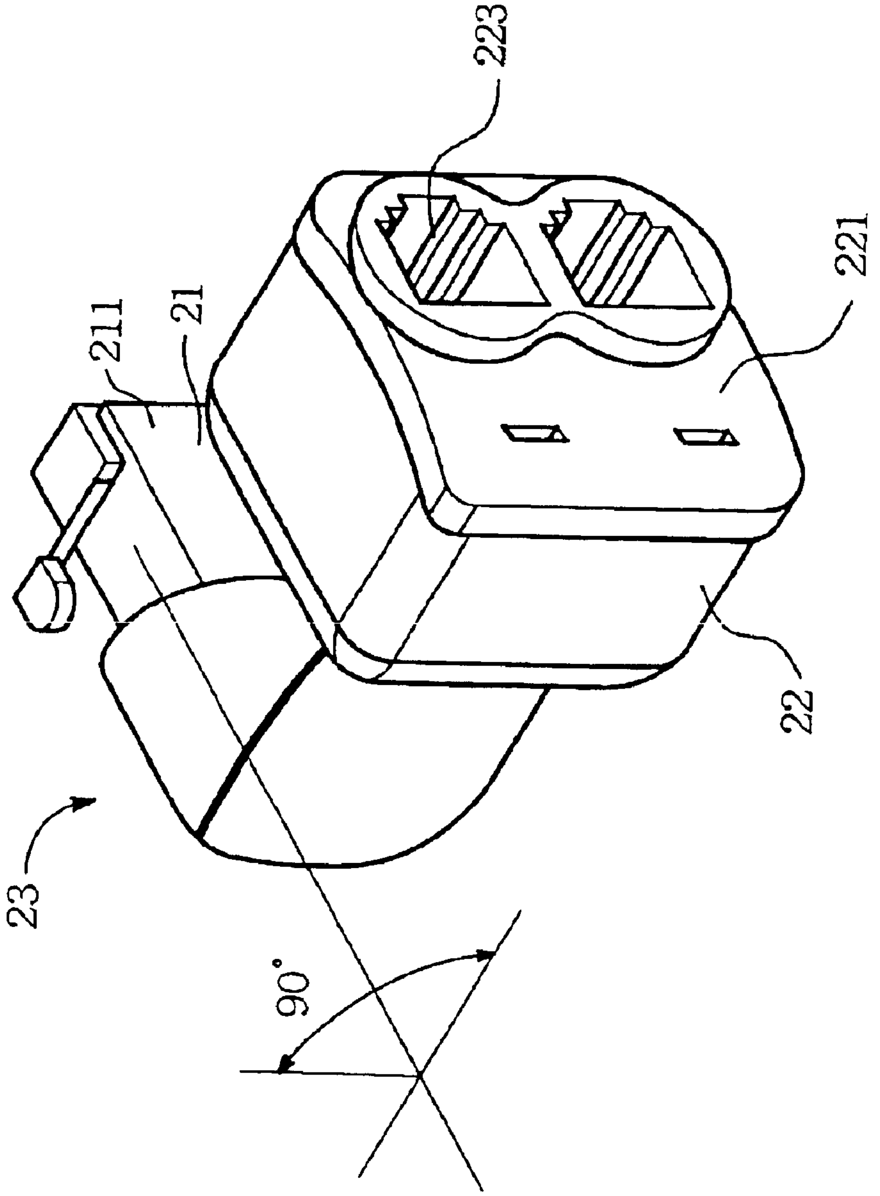
FIG. 4A is a perspective view of the rotational split adaptor of FIG. 2 posed at a rotated state with the splitter facing sideward.
Figure 4B:
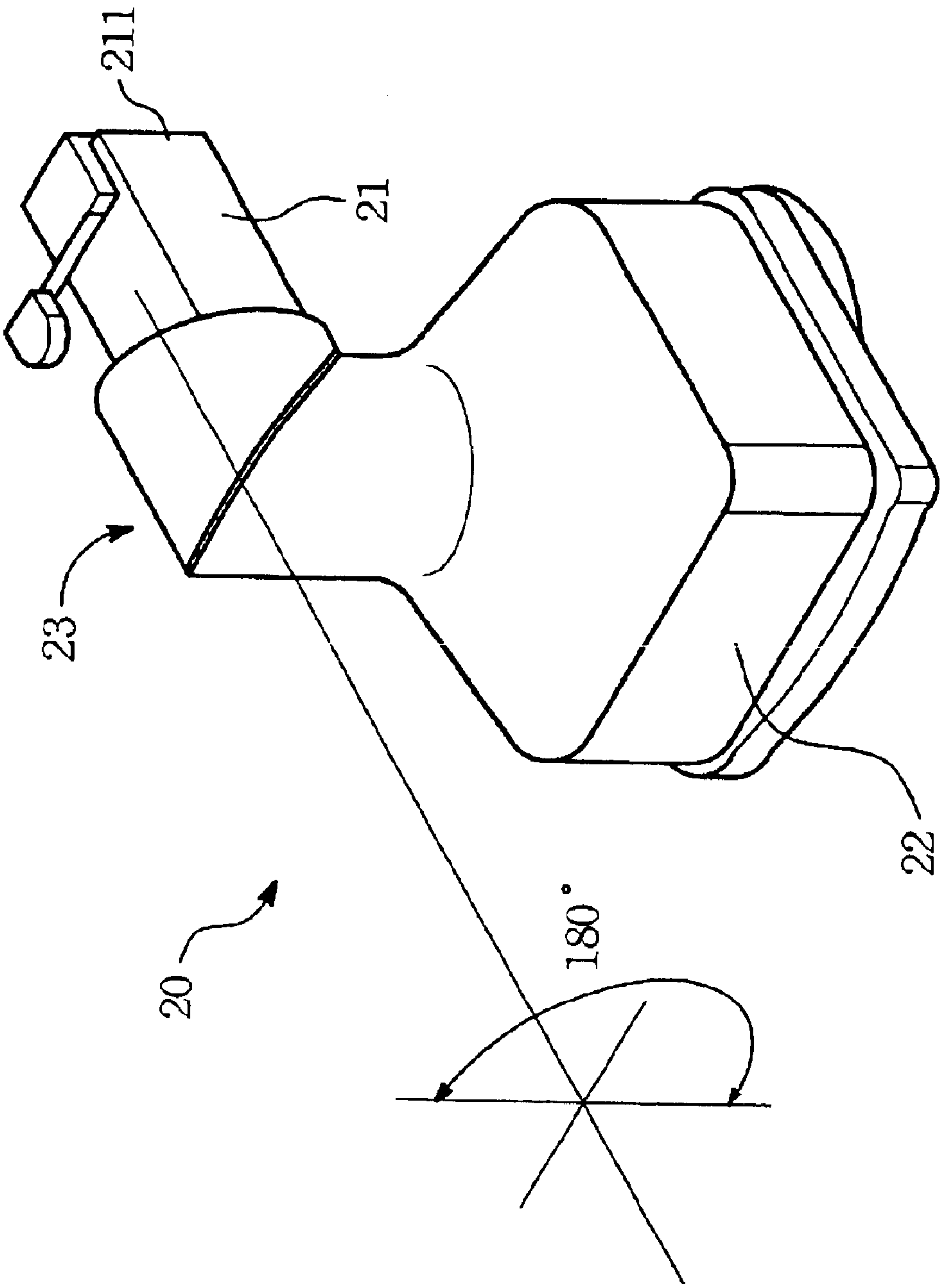
FIG. 4B is a perspective view of the rotational split adaptor of FIG. 2 posed at another rotated state with the splitter facing downward.

Referring now to FIG. 4A, in the case that the rotational joint 23 rotates 90° clockwise, the facing of the splitter 221 is then shifted from a direction perpendicular to the wall plate 30 (as shown in FIG. 3) to a new direction parallel to the wall plate 30. Referring now to FIG. 4B, in the case that the rotational joint 23 rotates 180° clockwise or counterclockwise from the state shown in FIG. 3, the facing of the splitter 221 can be then altered to a downward direction parallel to the wall plate 30.

As stated above, the rotational split adaptor in accordance with the present invention can extend and split the socket of the wall plate to the splitter at end of the socket assembly thereof. Though two sockets in parallel are shown in foregoing embodiments, yet it is well known in the art for a skilled person to mimic a splitter with more than two sockets after learning the teaching disclosed above. Also, by providing the rotational joint to the split adaptor of the present invention, the facing of the splitter can be then varied to meet easily the incoming plugs. Thereby, possible damage by bending the cords, such as degrading the communication quality and shortening the service time, can be then reduced. Moreover, in the case of not having any connecting cord, the socket assembly can be turned to face down the splitter so that possible dust contamination to the socket can be then avoided.

While the present invention has been particularly shown and described with reference to a preferred embodiment, it will be understood by those skilled in the art that various changes in form and detail may be without departing from the spirit and scope of the present invention.

We claim:

1. A rotational split adaptor for engaging with contacts of a communication socket, comprising:

a common plug, further including thereof a plug end and an opposing first oblique surface, said plug end capable of engaging the communication socket to have a plurality of contact terminals thereof coupling with said contacts of said communication socket;

a socket assembly, further including thereof a splitter and an opposing second oblique surface, said splitter having a plurality of parallel sockets electrically coupling with said communication socket, said second oblique surface being pairing with said first oblique surface; and a rotational joint, constructed to pair said first oblique surface and said second oblique surface for providing angular sliding in between so as to alter angling between said socket assemble and said common plug.

2. The rotational split adaptor according to claim 1, wherein said plug end further includes a spring press bar at an upper position thereof to firmly engage said plug end inside said communication socket and to easily retrieve said plug end from said communication socket.

3. The rotational split adaptor according to claim 1, wherein said first oblique surface faces downward at a 45 degree while said second oblique surface faces upward at another 45 degree.

4. The rotational split adaptor according to claim 1, wherein said rotational joint further includes a sleeve located at said second oblique surface and a pivotal shaft extended from said first oblique surface.

5. The rotational split adaptor according to claim 1, wherein said rotational joint is a hollow structure for allowing signal wires extending from said plug end to said splitter to penetrate therethrough.

6. The rotational split adaptor according to claim 1, wherein said rotational joint has angling options ranged from 180° to −180°.

* * * * *